(12) United States Patent
Kasada et al.

(10) Patent No.: US 7,402,375 B2
(45) Date of Patent: Jul. 22, 2008

(54) CYANINE DYES

(75) Inventors: Chiaki Kasada, Okayama (JP); Yasushi Aizawa, Okayama (JP); Toshio Kawata, Okayama (JP); Shigeo Yasui, Okayama (JP)

(73) Assignee: Kabushiki Kaisha Hayashibara Seibutsu Kagaku Kenkyujo, Okayama (JP)

( * ) Notice: Subject to any disclaimer, the term of this patent is extended or adjusted under 35 U.S.C. 154(b) by 0 days.

(21) Appl. No.: 10/438,839

(22) Filed: May 16, 2003

(65) Prior Publication Data

US 2003/0181727 A1 Sep. 25, 2003

Related U.S. Application Data

(62) Division of application No. 09/913,730, filed as application No. PCT/JP00/08297 on Nov. 24, 2000, now Pat. No. 6,683,188.

(30) Foreign Application Priority Data

Dec. 17, 1999 (JP) ............................. 1999/358949

(51) Int. Cl.
*G11B 7/24* (2006.01)
(52) U.S. Cl. ............... 430/270.2; 430/945; 430/270.18; 428/64.8; 369/284
(58) Field of Classification Search ............ 430/270.2, 430/945, 270.19, 270.18; 428/64.8; 369/288; 548/469, 219
See application file for complete search history.

(56) References Cited

U.S. PATENT DOCUMENTS

| | | | |
|---|---|---|---|
| 3,509,049 A | 4/1970 | Zweidler | |
| 3,671,254 A | 6/1972 | Dostes | |
| 3,729,467 A | 4/1973 | Zweidler et al. | |
| 3,745,036 A | 7/1973 | Zweidler | |
| 3,752,670 A | 8/1973 | Needler et al. | |
| 3,772,030 A | 11/1973 | Gilman, Jr. et al. | |
| 4,225,666 A | 9/1980 | Locker et al. | |
| 4,225,705 A | 9/1980 | Bader et al. | |
| 4,233,121 A | 11/1980 | Szebenyi nee Gyori | |
| 4,412,231 A * | 10/1983 | Namba et al. ............ | 346/135.1 |

(Continued)

FOREIGN PATENT DOCUMENTS

DE 1260432 2/1968

(Continued)

OTHER PUBLICATIONS

Hamer, "The cyanine Dyes and Related Compounds", pp. 32-85 (1964).*

(Continued)

*Primary Examiner*—Martin J Angebranndt
(74) *Attorney, Agent, or Firm*—Browdy and Neimark

(57) ABSTRACT

The present invention provides organic dye compounds having their absorption maxima in a region ranging from the ultraviolet region to a relatively short wavelength visible region and uses thereof. The present invention provides specific monomethine cyanine dyes, light absorbents and optical recording media comprising the monomethine cyanine dyes, and a process for producing the monomethine cyanine dyes which comprises a step of reacting a quaternary ammonium salt of nitrogen atom-containing heterocyclic compound having a reactive methyl group with a quaternary ammonium salt of nitrogen atom-containing heterocyclic compound having an appropriate leaving group.

2 Claims, 1 Drawing Sheet

U.S. PATENT DOCUMENTS

| | | | | |
|---|---|---|---|---|
| 4,735,889 A | * | 4/1988 | Namba et al. | 430/270.16 |
| 4,963,901 A | * | 10/1990 | Wilkinson et al. | 347/225 |
| 5,219,707 A | * | 6/1993 | Namba | 430/270.19 |
| 5,316,899 A | * | 5/1994 | Miyadera et al. | 430/270.2 |
| 5,411,854 A | | 5/1995 | Brust et al. | |
| 5,460,937 A | | 10/1995 | Blease et al. | |
| 5,604,004 A | * | 2/1997 | Suzuki et al. | 428/64.1 |
| 5,671,207 A | | 9/1997 | Park | 369/44.23 |
| 6,246,656 B1 | * | 6/2001 | Kawakubo et al. | 369/112.23 |
| 6,370,093 B1 | * | 4/2002 | Tada et al. | 369/44.25 |
| 6,383,722 B1 | * | 5/2002 | Shinkai et al. | 430/321 |
| 6,683,188 B1 | * | 1/2004 | Kasada et al. | 548/181 |
| 2005/0219995 A1 | * | 10/2005 | Morita et al. | 369/275.4 |
| 2005/0219996 A1 | * | 10/2005 | Morita et al. | 369/275.4 |
| 2005/0219997 A1 | * | 10/2005 | Morita et al. | 369/275.4 |
| 2005/0226135 A1 | * | 10/2005 | Morita et al. | 369/275.4 |
| 2005/0227178 A1 | * | 10/2005 | Morita et al. | 430/270.18 |

FOREIGN PATENT DOCUMENTS

| | | | |
|---|---|---|---|
| DE | 19617767 | | 10/1997 |
| DE | 19635098 | | 3/1998 |
| DE | 19717229 | | 10/1998 |
| EP | 887202 | * | 12/1998 |
| EP | 905202 | * | 3/1999 |
| FR | 2097822 A1 | | 3/1972 |
| GB | 424559 | * | 2/1935 |
| GB | 438420 | * | 11/1935 |
| GB | 811876 | * | 4/1959 |
| GB | 1055671 | | 1/1967 |
| GB | 1255356 | | 12/1971 |
| GB | 1255880 | | 12/1971 |
| GB | 1391792 | | 4/1975 |
| JP | 54-143440 | * | 11/1979 |
| JP | 63-034189 | * | 2/1988 |
| JP | 64-019355 | | 1/1989 |
| JP | 03-051182 | * | 3/1991 |
| JP | 04-074690 | * | 3/1992 |
| JP | 05-038879 | * | 2/1993 |
| JP | 05-139043 | | 6/1993 |
| JP | 06-040161 | * | 2/1994 |
| JP | 09-323478 | | 12/1997 |
| JP | 10-006651 | | 1/1998 |
| JP | 11-034500 | * | 2/1999 |

OTHER PUBLICATIONS

"Magneto-optical recording materials", Gambino, Ed. (2000) pp. 1-3.*

Ficken et al., "The reactivity of the alkylthio group in nitrogen . . . ", J. Chem. Soc., (1960) pp. 1529-1536.*

* cited by examiner

CYANINE DYES

CROSS-REFERENCE TO RELATED APPLICATIONS

The present application is a divisional of Ser. No. 09/913,730, filed Aug. 17, 2001 which is the national stage under 35 U.S.C. 371 of international application PCT/JP00/08297, filed Nov. 24, 2000 which designated the United States, and which international application was published under PCT Article 21(2) in the English language, the entire contents of which are hereby incorporated by reference.

FIELD OF THE INVENTION

The present invention relates to novel organic dye compounds, and particularly to monomethine cyanine dyes which are sensitive to visible light of a relatively short wavelength.

BACKGROUND OF THE INVENTION

In a multimedia age, optical recording media such as compact disc recordable (CD-R, a write-once memory using compact disc); and digital versatile disc (DVD-R, a write-once memory using digital video disc), have been highlighted. Optical recording media can be classified roughly into inorganic optical recording media which have recording layers composed of inorganic substances such as tellurium, selenium, rhodium, carbon, or carbon sulfide; and organic optical recording media which have recording layers composed of light absorbents containing organic dye compounds.

Among these optical recording media, organic media are usually prepared by dissolving a polymethine dye in an organic solvent such as 2,2,3,3-tetrafluoro-1-propanol (abbreviated as "TFP" hereinafter), coating the solution onto the surface of a polycarbonate substrate, drying the solution to form a recording layer, and sequentially attaching closely a reflection layer made of a metal such as gold, silver or copper and a protective layer made of an ultraviolet ray hardening resin onto the surface of the recording layer. When compared with inorganic optical recording media, organic optical recording media have the drawback that their recording layers may be easily changed by exposure to light such as reading- and natural light, but have the merit that they can be manufactured at a lower cost because their recording layers can be formed by preparing solutions of light absorbents and directly coating the solutions onto the surface of substrates. Also, organic optical recording media are now becoming the predominant low-cost optical recording media because of the merits that they are mainly composed of organic substances so that they are substantially free of corrosion even when contacted with moisture or sea water; and because information, which is stored in optical recording media in a prescribed format, can be read out using a commercialized reader using thermal deformation type optical recording media, a kind of organic optical recording media.

What is urgently required of organic optical recording media is to increase their recording capacity to suit this multimedia age. The research for such an increment now eagerly continued in this field is to shorten the wavelength of 635-650 nm now used as a writing light to a wavelength of 450 nm or less to increase the recording capacity per one side to a level from 4.7 giga bytes (GB) to 15 GB or higher. The optical recording media with such an increased capacity can record six hours of moving images in quality equivalent to standard TV and just record two hours of moving images in quality equivalent to high-quality TV. However, most of the organic dye compounds now used in optical recording media are not applicable to laser beams with a wavelength of 450 nm or less, and therefore such organic dye compounds could not fulfill the need for high storage density required in many fields.

SUMMARY OF THE INVENTION

In view of the foregoing, the object of the present invention is to provide organic dye compounds which are sensitive to visible light having a relatively short wavelength, and to provide uses thereof.

To attain the above object, the present inventors eagerly studied and screened compounds. As a result, they found that specific monomethine cyanine dyes (may be called "monomethine cyanine dyes" hereinafter), which are obtainable through a step of reacting a quaternary ammonium salt of a nitrogen atom-containing heterocyclic compound having an active methyl group with a quaternary ammonium salt of a nitrogen atom-containing compound having a leaving group, have an absorption maximum in a relatively short-wavelength visible region, and which substantially absorbs visible light in such a visible region. They also found that, among these monomethine cyanine dyes, those which have sensitivity to laser beams with a wavelength of 450 nm or less when in a thin layer form can form minute pits on the recording surfaces at a relatively high density when irradiated by a laser beam at a wavelength 450 nm or less. The present invention was made based on the creation of the novel monomethine organic dye compounds which are sensitive to visible light having a relative short wavelength, and the discovery of their industrially useful characteristics.

DETAILED DESCRIPTION OF THE INVENTION

Figure 1:
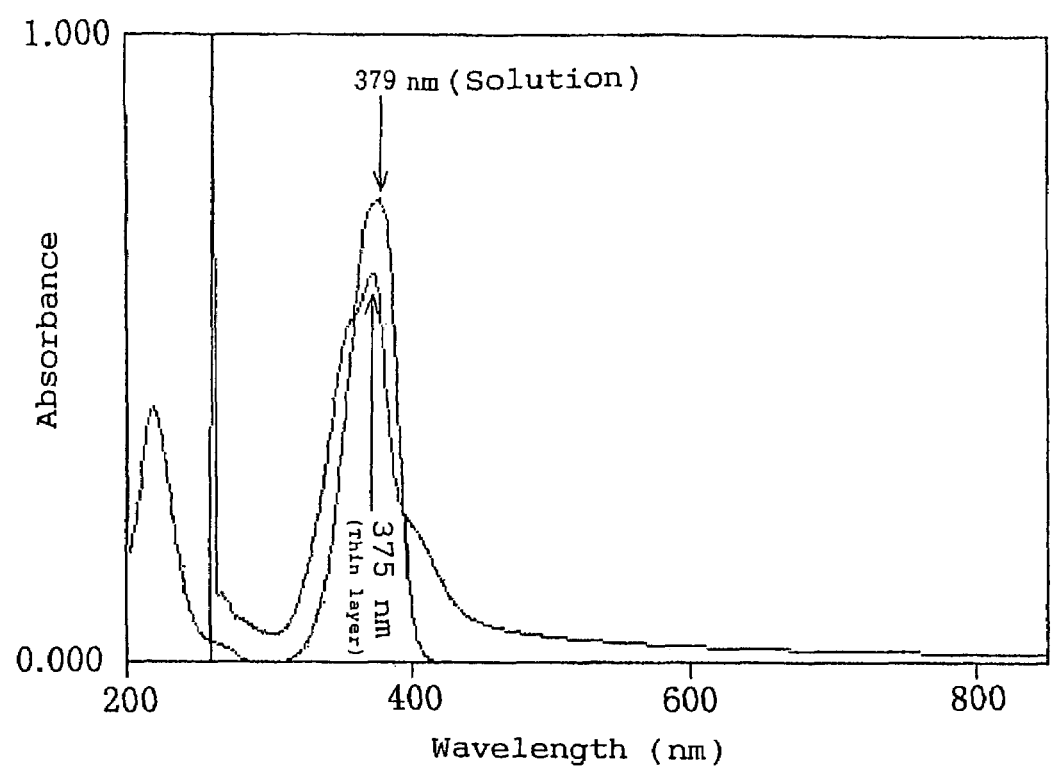
FIG. 1 shows visible absorption spectra of one of the monomethine cyanine dyes of the present invention when in solution form and in thin layer form.

The present invention relates to the monomethine cyanine dyes represented by the Formula 1.

$$\varnothing 1\text{-CH}=\varnothing 2 \quad \text{Formula 1:}$$

In Formula 1, ø 1 and ø 2 are the same or different heterocyclic groups represented by any one of Formulae 2 to 8 as resonance structures.

Formula 2:

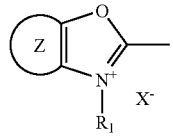

Formula 3:

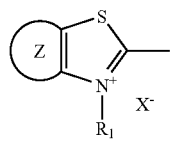

-continued

Formula 4:

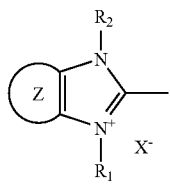

Formula 5:

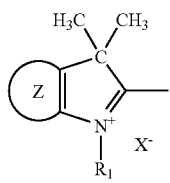

Formula 6:

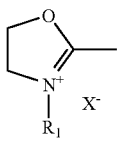

Formula 7:

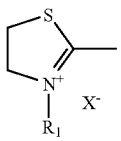

Formula 8:

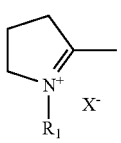

Throughout Formulae 2 to 5, Z represents, for example, a mono or polycyclic aromatic ring or heterocycle such as benzene, naphthalene, pyridine, quinoline, naphthylidine or quinoxaline ring, which may have one or more substituents. Examples of such substituents are halogens such as fluorine, chlorine, bromine, and iodine; ether groups such as methoxy, ethoxy, propoxy, isopropoxy, butoxy, tert-butoxy, pentyloxy, benzyloxy, phenoxy, o-tolyloxy, m-tolyloxy, and p-tolyloxy groups; ester groups such as methoxycarbonyl, ethoxycarbonyl, propoxycarbonyl, phenoxycarbonyl, o-tolyloxycarbonyl, m-tolyloxycarbonyl, p-tolyloxycarbonyl, acetoxy, and benzoyloxy groups; aromatic hydrocarbon groups such as phenyl, o-tolyl, m-tolyl, p-tolyl, xylyl, mesityl, o-cumenyl, m-cumenyl, p-cumenyl, nitrophenyl, and biphenyl groups; alkylsulfonyl groups such as methylsulfonyl, ethylsulfonyl, propylsulfonyl, and butylsulfonyl groups; alkylamino sulfonyl groups such as methylaminosulfonyl, dipropylaminosulfonyl, ethylaminosulfonyl, diethylamino sulfonyl, propylaminosulfonyl, dipropylaminosulfonyl, and butylaminosulfonyl groups; methylene dioxy group; nitro group; cyano group; sulfo group; and aliphatic hydrocarbon groups such as those which have 1 to 5 carbon atoms such as methyl, ethyl, propyl, isopropyl, isopropenyl, 1-propenyl, 2-propenyl, butyl, isobutyl, sec-butyl, tert-butyl, 1-butenyl, 1,3-butadienyl, pentyl, isopentyl, neopentyl, and 2-pentenyl groups. When the substituents have hydrogen atoms, one or more of the hydrogen atoms may be substituted, for example, with halogens such as fluorine, chlorine, bromine, and iodine. In Formulae 2 to 5, when Z does not exist, one or more of the substituents like those in the above Z may be bound to the position of Z. In the case of using the monomethine cyanine dyes of the present invention in optical recording media which use laser beams with a wavelength of not longer than 450 nm, and in the case of using different types of cyclic cores of ø 1 and ø 2 into a non-symmetric structure as a whole molecular structure and of forming either or both of the cyclic cores into a condensed ring, such a condensed ring is preferably restricted to form a bicyclic structure as a whole cyclic core structure, varying depending on that ø 1 and ø 2 are which of Formulae 2 to 5.

Throughout Formulae 2 to 8, $R_1$ represents an aliphatic hydrocarbon group and $R_2$ represents a hydrogen atom or the same or different aliphatic hydrocarbon group as in $R_1$. These aliphatic hydrocarbon groups may have one or more substituents. Examples of such aliphatic hydrocarbon groups are those which have one to eight carbon atoms, usually, for example, methyl, ethyl, propyl, isopropyl, isopropenyl, 1-propenyl, 2-propenyl, 2-propynyl, butyl, isobutyl, sec-butyl, tert-butyl, 2-butenyl, 2-butynyl, 1,3-butadienyl, pentyl, isopentyl, neopentyl, tert-pentyl, 1-methylpentyl, 2-methylpentyl, 2-pentenyl, 2-pentene-4-ynyl, hexyl, isohexyl, 5-methylhexyl, heptyl, and octyl groups. One or more of the hydrogen atoms of these aliphatic hydrocarbon groups may be substituted with halogens such as fluorine, chlorine, bromine, and iodine; ether groups such as methoxy, trifluoromethoxy, ethoxy, propoxy, isopropoxy, butoxy, tert-butoxy, pentyloxy, benzyloxy, and phenoxy groups; ester groups such as methoxycarbonyl, trifluoromethoxycarbonyl, ethoxycarbonyl, propoxycarbonyl, acetoxy, trifluoroacetoxy, and benzoyloxy groups; aliphatic hydrocarbon groups such as phenyl, o-tolyl, m-tolyl, p-tolyl, xylyl, mesityl, o-cumenyl, m-cumenyl, p-cumenyl, nitrophenyl, and biphenyl groups; heterocyclic groups such as 2-pyridyl, piperidino, pyrolidino, piperidinyl, morpholino, and 2-quinolyl groups; and others such as hydroxy, carboxy, sulfo, and sulfonic acid ester groups.

Throughout Formulae 2 to 8, $X^-$ represents an appropriate anion, usually, one selected from inorganic acid anions such as fluoride, chloride, bromide, iodide fluoric acid, chloric acid, bromic acid, iodic acid, perchloric acid, phosphoric acid, phosphoric acid hexafluoride, antimony acid hexafluoride, tin acid hexafluoride, fluoroboric acid, and tetrafluoroborate ions; organic acid anions such as thiocyanic acid, benzenesulfonic acid, naphthalenesulfonic acid, naphthalenedisulfonic acid, benzenecarboxylic acid, alkylcarboxylic acid, alkylsulfonic acid, trihaloalkylsulfonic acid, nicotinic acid ions, and tetracyanoquinonedimethane ions; and metal complex anions such as those of azo, bisphenyldithiol, thiocatecholchelate, thiobisphenolatechelate, bisdiol-α-diketone, and their related compounds. In Formulae 2 and 8, $R_1$ or $R_2$ has a negatively charged substituent, and $X^-$ does not exist when the substituent forms an internal salt.

The present invention relates to the monomethine cyanine dyes which have the aforesaid structures and absorption maxima in a relatively short wavelength visible region. Examples of the monomethine cyanine dyes are, for example, those represented by Chemical Formulae 1 to 48 which have a variety of uses in the fields which require compounds that absorb light in such a visible region. The monomethine cyanine dyes have absorption maxima in a region ranging from an ultraviolet region to a relatively short wavelength visible region, usually, at wavelengths of 500 nm or less, more particularly, about 350-450 nm. In particular, among these monomethine cyanine dyes, those which are sensitive to laser beams with wavelengths of 450 nm or less when in a thin-layer form, preferably, those which substantially absorb such laser beams in longer wavelength regions with their absorption maxima can be quite advantageously used as materials for high-density optical recording media such as DVD-Rs, which use laser beams with wavelengths of 450 nm or less as a reading light.

Chemical Formula 1:

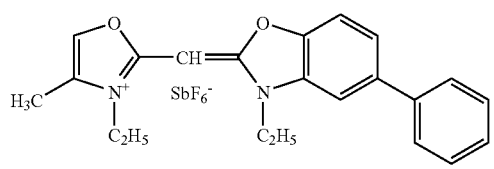

Chemical Formula 2:

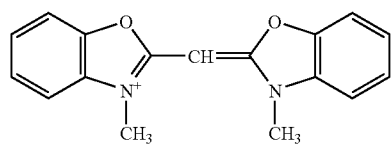

Chemical Formula 3:

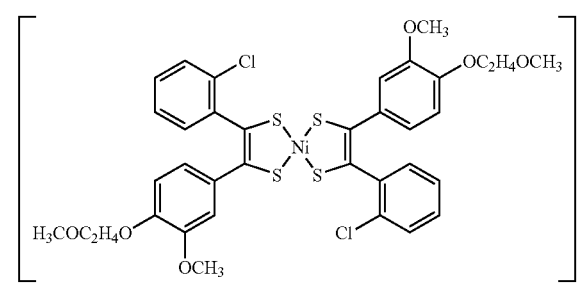

Chemical Formula 4:

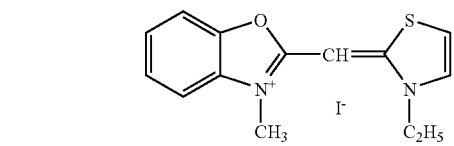

Chemical Formula 5:

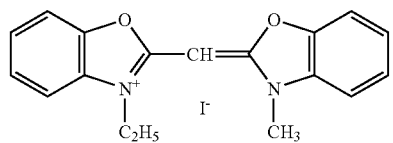

Chemical Formula 6:

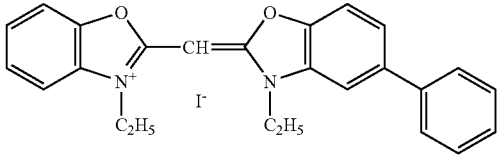

Chemical Formula 7:

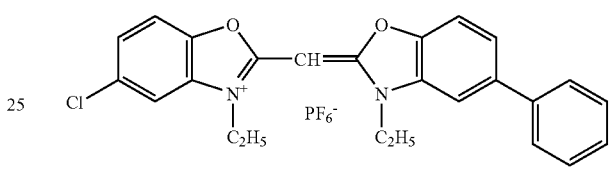

Chemical Formula 8:

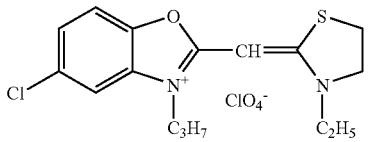

Chemical Formula 9:

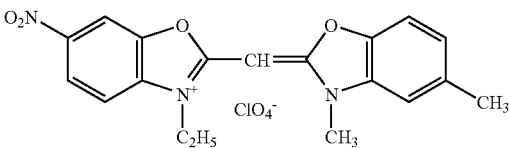

Chemical Formula 10:

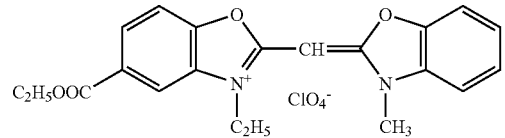

Chemical Formula 11:

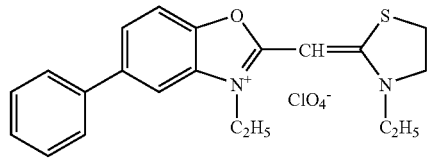

Chemical Formula 12:

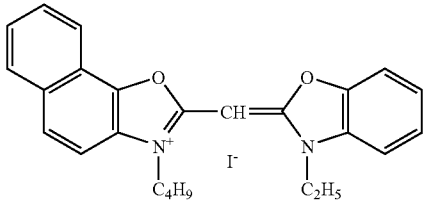

-continued
Chemical Formula 13:
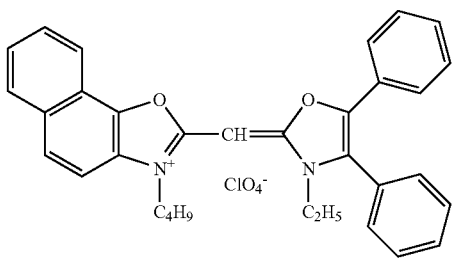
Chemical Formula 14:
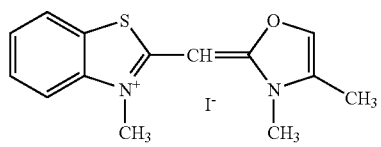
Chemical Formula 15:
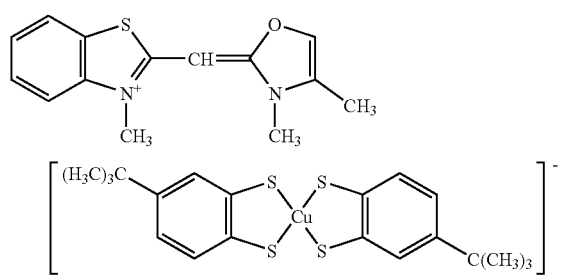
Chemical Formula 16:
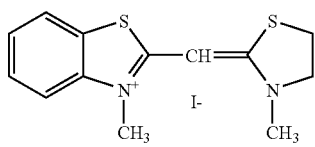
Chemical Formula 17:
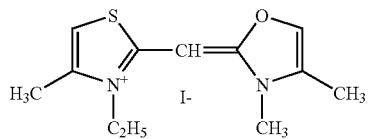
Chemical Formula 18:
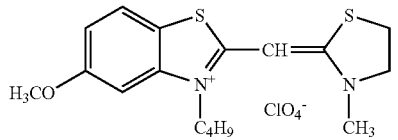
Chemical Formula 19:
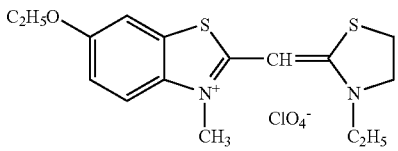
Chemical Formula 20:
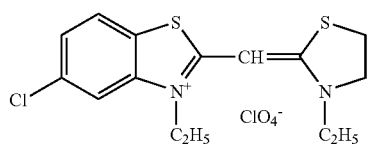
-continued
Chemical Formula 21:
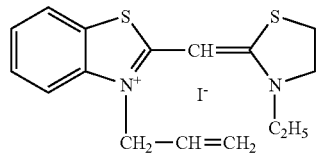
Chemical Formula 22:
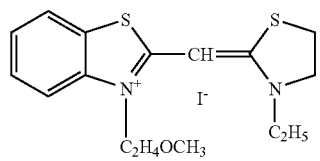
Chemical Formula 23:
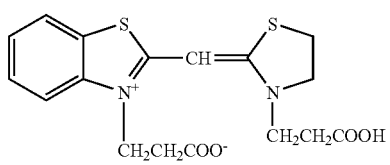
Chemical Formula 24:
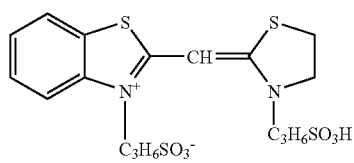
Chemical Formula 25:
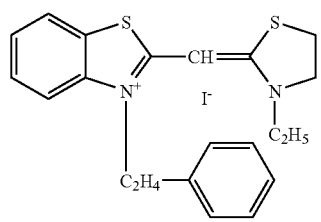
Chemical Formula 26:
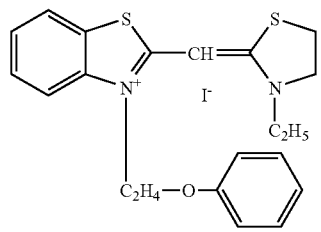
Chemical Formula 27:
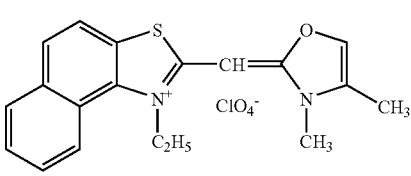
Chemical Formula 28:
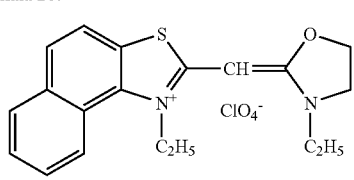

Chemical Formula 29:
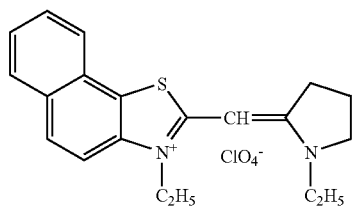
Chemical Formula 30:
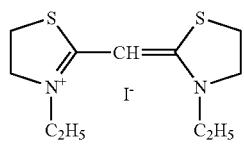
Chemical Formula 31:
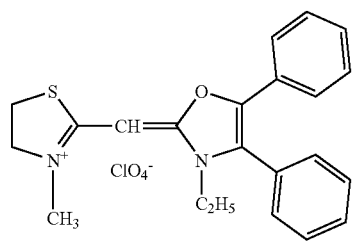
Chemical Formula 32:
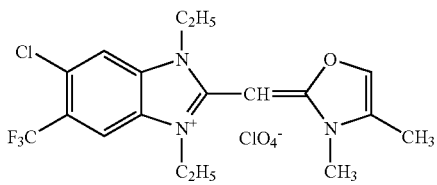
Chemical Formula 33:
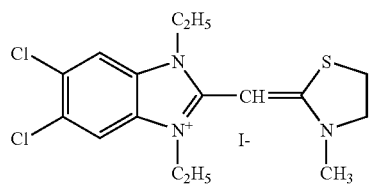
Chemical Formula 34:
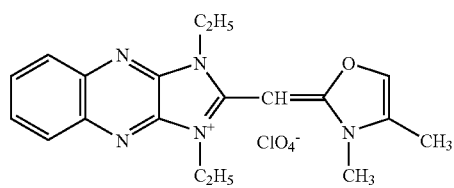
Chemical Formula 35:
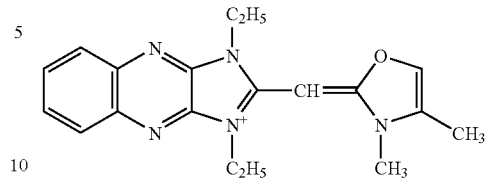
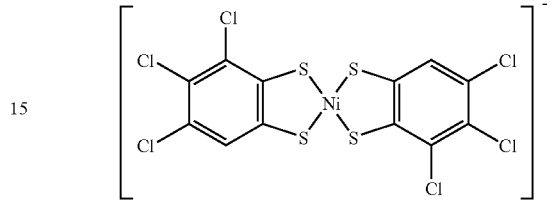
Chemical Formula 36:
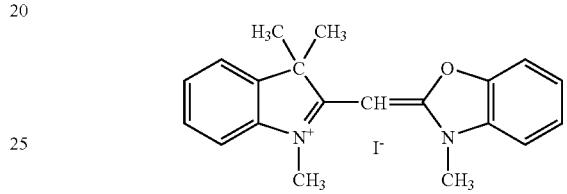
Chemical Formula 37:
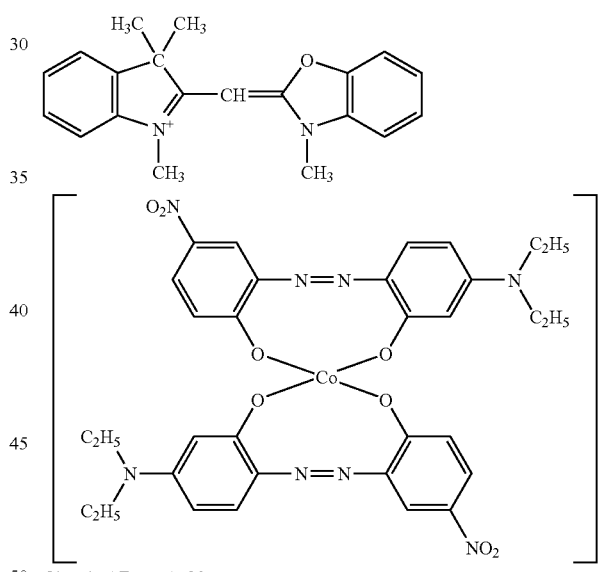
Chemical Formula 38:
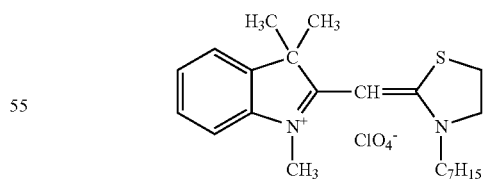
Chemical Formula 39:
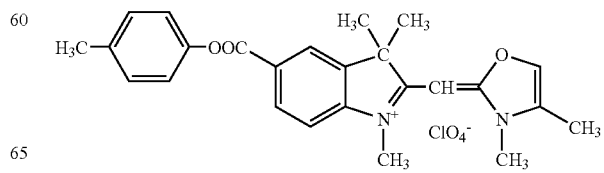

-continued

Chemical Formula 40:
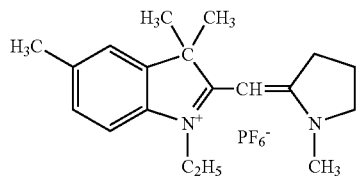

Chemical Formula 41:
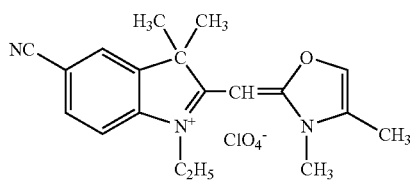

Chemical Formula 42:
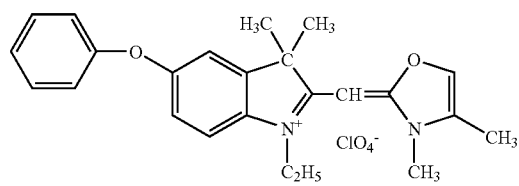

Chemical Formula 43:
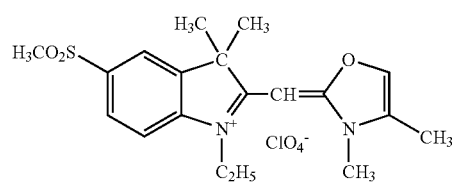

Chemical Formula 44:
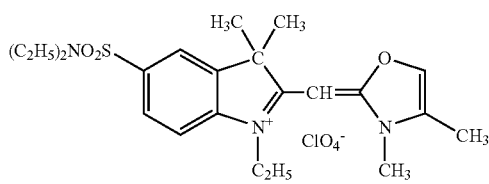

Chemical Formula 45:
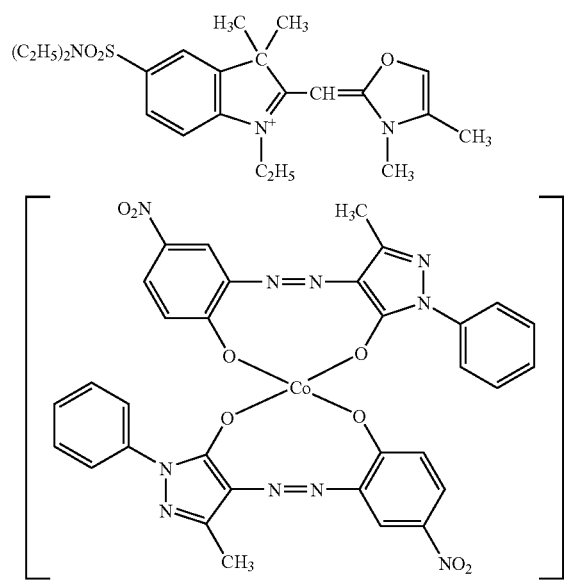

-continued

Chemical Formula 46:
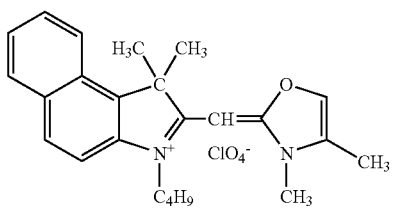

Chemical Formula 47:
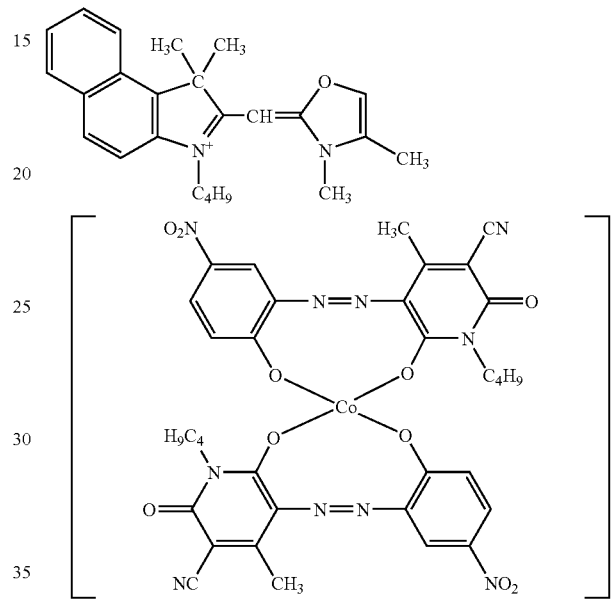

Chemical Formula 48:
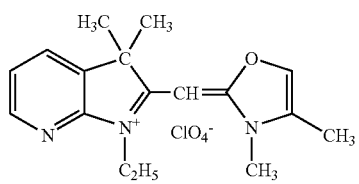

The monomethine cyanine dyes according to the present invention can be prepared by various methods. When production cost is important, the monomethine cyanine dyes can be advantageously prepared through a step of reacting a quaternary ammonium salt of a nitrogen atom-containing heterocyclic compound having a reactive methyl group with a quaternary ammonium salt of nitrogen atom-containing heterocyclic compound having an appropriate leaving group. According to this method, the monomethine cyanine dyes used in the present invention can be produced in a satisfactory yield by either reacting the compounds, represented by Formula 9 having ø1 corresponding to Formula 1, with the compounds represented by Formula 10 having ø2 corresponding to Formula 1; or reacting the compounds, represented by Formula 11 having ø1 corresponding to Formula 1, with the compounds represented by Formula 12 having ø2 corresponding to Formula 1. In Formulae 10 and 11, L represents an appropriate leaving group, usually, a mercapto group or alkylthio group such as methylthio, ethylthio, or propylthio group.

ø1-CH₃          Formula 9:

ø2-L            Formula 10:

ø1-L            Formula 11:

ø2-CH₃          Formula 12:

For example, adequate amounts (usually, about equimolar) of the compounds represented by Formulae 9 and 10 or the compounds represented by Formula 11 and 12 are optionally dissolved in an appropriate solvent and reacted by heat refluxing at ambient temperature or at a higher temperature under heating and stirring conditions, after being admixed with an adequate amount of a basic compound(s) such as sodium hydroxide, sodium bicarbonate, potassium carbonate, sodium acetate, potassium acetate, ammonia, triethylamine, pyridine, piperidine, pyrrolidine, morpholine, 1,8-diazabicyclo[5.4.0]-7-undecene, aniline, N,N-dimethylaniline, or N-diethylaniline; an acid compound such as hydrochloric acid, sulfuric acid, nitric acid, methane sulfonic acid, p-toluenesulfonic acid, acetic acid, anhydrous acetic acid, anhydrous propionic acid, trifluoroacetic acid, or trifluorosulfonic acid; or a Lewis acid compound such as aluminum chloride, zinc chloride, tin tetrachloride, or titanium tetrachloride.

Examples of the solvent include hydrocarbons such as pentane, hexane, cyclohexane, octane, benzene, toluene, and xylene; halogen compounds such as carbon tetrachloride, chloroform, 1,2-dichloroethane, 1,2-dibromoethane, trichloroethylene, tetrachloroethylene, chlorobenzene, bromobenzene, and α-dichlorobenzene; alcohols and phenols such as methanol, ethanol, 1-propanol, 2-propanol, 1-butanol, 2-butanol, isobutyl alcohol, isopentyl alcohol, cyclohexanol, ethylene glycol, propylene glycol, 2-methoxyethanol, 2-ethoxyethanol, phenol, benzyl alcohol, cresol, diethylene glycol, triethylene glycol, glycerine; ethers such as diethyl ether, diisopropyl ether, tetrahydrofuran, tetrahydropyran, 1,4-dioxane, anisole, 1,2-dimethoxyethane, diethylene glycol dimethyl ether, dicyclohexyl-18-crown-6, methyl carbitol, and ethylcarbitol; ketones such as furfural, acetone, ethyl methyl ketone, and cyclohexanone; acids and derivatives thereof such as acetic acid, anhydrous acetic acid, trichloroacetic acid, trifluoroacetic acid, anhydrous propionic acid, ethyl acetate, butyl carbonate, ethylene carbonate, propylene carbonate, formamide, N-methyl formamide, N,N-dimethylformamide, N-acetamide, N,N-dimethylacetamide, hexamethylphosphoric triamide, and trimethyl phosphate; nitrites such as acetonitrile, propionitrile, succinonitrile, and benzonitrile; nitro compounds such as nitromethane and nitrobenzene; sulfur-atom-containing compounds such as dimethylsulfoxide and sulfolane; and water, which all can be used in an appropriate combination, if necessary.

In the case of using such solvents, the greater the volume of solvents the lower the reaction efficiency. On the contrary, the lower the volume of solvents, the more difficult the homogenous heating and stirring, become and undesirable side-reactions may easily occur. Thus, the solvents should preferably be used in an amount up to 100 times by weight of the material compounds, usually, in the range of 5-50 times. Depending on the types of the material compounds and the reaction conditions used, the reaction should preferably be terminated within 10 hours, usually, within 0.5-5 hours. The reaction procedure can be monitored by conventional methods such as thin-layer chromatography, gas chromatography, and high-performance liquid chromatography. After completion of the reaction, the intact reaction mixture, if necessary, can be subjected to conventional counter-ion exchange reaction to obtain the monomethine cyanine dyes, having a desired counter ion, of the present invention. All the monomethine cyanine dyes represented by Formulae 1 to 48 can be easily obtained by the above methods. Every compound represented by Formulae 9 to 12 can be obtained in accordance with the conventional methods for preparing cyclic cores in the related compounds.

The monomethine cyanine dyes thus obtained can be used in the form of an intact reaction mixture, however, prior to use, they are purified by conventional methods used for purifying the related compounds such as dissolution, extraction, separation, decantation, filtration, concentration, thin-layer chromatography, column chromatography, gas chromatography, high-performance liquid chromatography, distillation, crystallization, and sublimation. If necessary, these methods can be used in an appropriate combination. For use in optical recording media such as DVD-Rs and dye lasers, the monomethine cyanine dyes of the present invention should preferably be purified by methods such as distillation, crystallization and/or sublimation, prior to use.

The light absorbents referred to in the present invention include those in general which contain one or more of the monomethine cyanine dyes, have sensitivity to visible light of a relatively short wavelength inherent to the monomethine cyanine dyes, and use the properties to substantially absorb the relatively short-wavelength visible light, independently of the composition and the physicochemical properties of the light absorbents. Accordingly, the light absorbents of the present invention may be those which consist of the monomethine cyanine dyes and optionally one or more other ingredients depending on use. One of the fields in which the light absorbents can be advantageously used is of optical recording media, and, in such a field, the light absorbents can be preferably used as materials for composing recording layers for organic optical recording media, particularly, high-density optical recording media which use laser beams with wavelengths of 450 nm or less as a writing light. When used in optical recording media, the light absorbents can be used, if necessary, together with one or more conventional materials used in optical recording media, for example, light absorbents containing other organic dye compounds sensitive to visible light, light-resistant improvers, binders, dispersing agents, flame retardants, lubricants, antistatic agents, surfactants, thermo interference agents, plasticizers, colorants, developers, and solubilizers.

The light absorbents of the present invention for use in organic optical recording media or organic ablation-type optical recording media can be prepared in accordance with the methods used for conventional optical recording media because they do not need any special treatment and handling when used in optical recording media. For example, to control the reflectance and the absorptance in recording layers, the monomethine cyanine dyes can be, if necessary, incorporated with one or more other organic dye compounds sensitive to visible light and further one or more conventionally used light-resistant improvers, binders, dispersing agents, flame retardants, lubricants, antistatic agents, surfactants, thermal interference agents, and plasticizers. The resulting mixtures are then dissolved in organic solvents, and the solutions are homogeneously coated over either surface of substrates by spraying, soaking, roller coating, or rotary coating method; and dried to form thin layers as recording layers containing light absorbents, and, if necessary, followed by forming reflection layers to be closely attached on the recording layers by means of vacuum deposition, chemical vapor deposition, sputtering, or ion-planting method using metals such as gold, silver, copper, platinum, aluminum, cobalt, tin, nickel, iron, and chromium or using commonly used materials for organic reflection layers to attain reflection efficiency, which makes it possible to read recorded information, for example, of 20% or higher, preferably, 30% or higher. Alternatively, to protect the recording layers from scratches, dust, stains, etc., coatings may be applied over the recording layers with ultraviolet ray hardening resins or thermosetting resins which contain flame retardants, stabilizers or antistatic agents, and then the coatings are hardened by irradiating light or heating to form protective layers attached closely over the reflection layers. Thereafter, if necessary, a pair of the above substrates with recording-, reflection-, and recording-layers are faced and attached together using, for example, adhesives or viscous sheets; or protective plates, which are made of the same materials and shapes as the substrates, are attached to the protective layers of the substrates.

Other organic dye compounds usable in combination with the monomethine cyanine dyes of the present invention are not specifically restricted as long as they are sensitive to visible light and capable of controlling the reflectance or the absorptance of recording layers of optical recording media when used with the monomethine cyanine dyes. Examples of such organic dye compounds are polymethine dyes such as cyanine, merocyanine, oxonol, azulenium, squallilium, styryl, pyrylium, thiopyrylium, and phenanthrene dyes, which have either a monomethine chain that may have one or more substituents or a polymethine chain such as di-, tri-, tetra-, penta-, hexa-, and hepta-methine-chains, wherein the both ends of the monomethine chain or the polymethine chain bind the same or different cyclic cores such as imidazoline, imidazole, benzimidazole, α-naphthoimidazole, β-naphthoimidazole, indole, isoindole, indolenine, isoindolenine, benzindolenine, pyridinoindolenine, oxazoline, oxazole, isoxazole, benzoxazole, pyridineoxazole, α-naphthoxazole, β-naphthoxazole, selenazoline, selenazole, benzoselenazole, α-naphthoselenazole, β-naphthoselenazole, thiazoline, thiazole, isothiazole, benzothiazole, α-naphthothiazole, β-naphthothiazole, tellulazoline, tellulazole, benzotellulazole, α-naphthotellulazole, β-naphthotellulazole, aquaridine, anthracene, isoquinoline, isopyrrole, imidaquinoxaline, indandione, indazole, indoline, oxadiazole, carbazole, xanthene, quinazoline, quinoxaline, quinoline, chroman, cyclohexanedione, cyclopentanedione, cinnoline, thiodiazole, thiooxazolidone, thiophene, thionaphthene, thiobarbituric acid, thiohydantoin, tetrazole, triazine, naphthalene, naphthyridine, piperazine, pyrazine, pyrazole, pyrazoline, pyrazolidine, pyrozolone, pyran, pyridine, pyridazine, pyrimidine, pyrylium, pyrrolidine, pyrroline, pyrrole, phenazine, phenanthridine, phenanthrene, phenanthroline, phthalazine, pteridine, furazan, furan, purine, benzene, benzoxazine, benzopyran, morpholine, and rhodanine rings, which may have one or more substituents. In addition, the following organic dye compounds can be exemplified; acridine, azaannulene, azo, azo metal complex, anthraquinone, indigo, indanthrene, oxazine, xanthene, dioxazine, thiazine, thioindigo, tetrapyraporphyradine, triphenylmethane, triphenothiazine, napthoquinone, pyromethene, phthalocyanine, benzoquinone, benzopyran, benzofuranone, porphyrin, rhodamine dyes, and their related compounds. Depending on use, the above organic dye compounds can be used in an appropriate combination. Preferable organic dye compounds used in combination with the monomethine cyanine dyes of the present invention are those which have absorption maxima in a visible region, particularly, those at wavelengths of 400-850 nm, when in a thin-layer form. The organic dye compounds as disclosed in Japanese Patent Application No. 343,211/99, titled "Styryl dyes" and Japanese Patent Application No. 355,176/99, titled "Optical absorbents and uses thereof", both of which were applied for by the same applicant of the present invention, are most preferably used.

The light-resistant improvers used in the present invention are, for example, nitroso compounds such as nitrosodiphenylamine, nitrosoaniline, nitrosophenol, and nitrosonaphthol; and metal complexes such as those of dithiolate and formazan, for example, tetracyanoquinodimethane compounds, diimmonium salts, "NKX-1199" (bis[2'-chloro-3-methoxy-4-(2-methoxyethoxy)dithiobenzyl]nickel) produced by Hayashibara Biochemical Laboratories, Inc., Okayama, Japan, which all can be used in an appropriate combination, if necessary. Preferable light-resistant improvers are those as disclosed in Japanese Patent Application No. 163,036/99, titled "Formazan metal complexes" applied for by the same applicant as the present invention, which contain metal complexes of dithiolate and formazan, most preferably, those which contain metal complexes of metals such as nickel, zinc, cobalt, iron, copper, palladium, etc., and as ligands one or more of the formazan derivatives and their tautomers, which have a pyridine ring at C-5 in the formazan skeleton and have a pyridine or furan ring bound to C-3 of the formazan skeleton. The combination use of the light-resistant improvers lowers the solubility of the monomethine cyanine dyes of the present invention in organic solvents and effectively inhibits the undesirable deterioration, fading, color change, and quality change of the monomethine cyanine dyes, which are inducible by the exposure of reading and environmental lights, without spoiling the preferable optical properties of the monomethine cyanine dyes. As for the composition ratio, 0.01-5 moles, preferably, 0.1-1 mole of a light-resistant improver(s) can be incorporated into one mole of the present monomethine cyanine dye(s) while increasing or decreasing the ratio. The light-resistant improvers should not necessarily exist independently of the monomethine cyanine dyes of the present invention, and if necessary, the monomethine cyanine dyes can be formulated into salts, complexes, or compounds by combining with commonly used organic metal complex anions, which are capable of improving the light resistance, such as those of azo, bisphenyldithiol, phenylbisdiol, thiocatecholchelate, thiobisphenolatechelate, or bisdithiol-α-diketone, which are disclosed in Japanese Patent Kokai Nos. 19,355/89, 139,034/93, 323,478/97, 6,651/98, etc., by using appropriate spacers and crosslinking agents such as alkoxides or cyanates of metal elements, for example, titanium, zirconium, aluminum, etc., or complexes of these metal elements having carbonyl compounds or hydroxy compounds as ligands.

The monomethine cyanine dyes of the present invention have satisfactory solubility in organic solvents without substantially causing problems and do not substantially restrict the types of organic solvents used for coating the light absorbents on substrates. Thus, in the preparation of optical recording media according to the present invention, for example, TFP used frequently to prepare optical recording media and the following organic solvents other than TFP can be selected and used in an appropriate combination: For example, hydrocarbons such as hexane, cyclohexane, methylcyclohexane, dimethylcyclohexane, ethylcyclohexane, isopropylcyclohexane, tert-butylcyclohexane, octane, cyclooctane, benzene, toluene, and xylene; halogenides such as carbon tetrachloride, chloroform, 1,2-dichloroethane, 1,2-dibromoethane, trichloroethylene, tetrachloroethylene, chlorobenzene, bromobenzene, and α-dichlorobenzene; alcohols and phenols such as methanol, ethanol, propanol, isopropanol, 2,2,2-trifluoroethanol, butanol, 2-butanol, isobutanol, isopentanol, cyclohexanol, ethylene glycol, propylene glycol, 2-methoxyethanol (methyl cellosolve), 2-ethoxyethanol (ethyl cellosolve), phenol, benzyl alcohol, cresol, diethylene glycol, triethylene glycol, glycerine, and diacetone alcohol; ethers such as diethyl ether, diisopropyl ether, tetrahydrofuran, tetrahydropyran, 1,4-dioxane, anisole, 1,2-dimethoxyethane, cyclohexyl-18-crown-6, methyl carbitol, and ethylcarbitol; ketones such as furfural, acetone, 1,3-diacetyl acetone, ethyl methyl ketone, and cyclohexanone; esters such as ethyl acetate, butyl acetate, ethylene carbonate, propylene carbonate, and trimethyl phosphate; amides such as formamide, N-methyl formamide, N,N-dimethylformamide, N-methylacetamide, N,N-dimethylacetamide, and hexamethylphosphoric triamide; nitriles such as acetonitrile, propionitrile, succinonitrile, and benzonitrile; nitro compounds such as nitromethane and nitrobenzene; amines such as ethylene diamine, pyridine, piperidine, morpholine, and N-methylpyrrolidone; and sulfer atom-containing compounds such as dimethylsulfoxide and sulfolane.

Particularly, since the monomethine cyanine dyes of the present invention have relatively high solubility in easily volatile organic solvents such as TFP, methyl cellosolve, ethyl cellosolve, and diacetone alcohol, they are substantially free from dye crystallization when sequentially dissolved in the organic solvents, coated on substrates, and dried; and do not cause inconsistent thickness and surface of the formed recording layers. Most of the monomethine cyanine dyes of the present invention have satisfactory solubility in non-halogen solvents, for example, cellosolves such as methyl cellosolve and ethyl cellosolve; alcohols such as diacetone alcohol; and ketones such as ethyl methyl ketone and cyclohexanone. Accordingly, the above non-halogen solvents hardly damage substrates or spoil the environment when used to dissolve the present light absorbents for coating on substrates.

The substrates used in the present invention are not specifically restricted and usually processed by forming appropriate materials, for example, into discs, 12 cm in diameter and 0.1-1.2 mm in thickness, using the methods such as compression molding, injection molding, compression-injection molding, photopolymerization method (2P method), thermosetting integral method, and lightsetting integral method. Depending on their final use, the discs thus obtained can be used singularly or plurally after appropriately attaching them together with adhesives or adhesive sheets, etc. In principal, any one of the materials for the substrates can be used in the present invention as long as they are substantially transparent and have a transmittance of at least 80%, preferably, at least 90% at a wavelength ranging from 350 nm to 800 nm. Examples of such materials are glasses, ceramics, and others such as synthetic resins including polyacrylate, poly (methyl methacrylate), polycarbonate, polystyrene (styrene copolymer), polymethylpentene, polyester, polyolefin, polyimide, polyetherimide, polysulfone, polyethersulfone, polyarylate, polycarbonate/polystyrene alloy, polyestercarbonate, polyphthalatecarbonate, polycarbonateacrylate, non-crystalline polyolefin, methacrylate copolymer, diallylcarbonatediethylene-glycol, epoxy resins, and phenolic resins, among which polycarbonate- and acrylic-resins are usually used frequently. In the case of using plastic substrates, concaves for expressing synchronizing-signals and addresses of tracks and sectors are usually transferred to the internal circuit of the tracks during their formation. The form of concaves are not specifically restricted and preferably formed to give 0.3-0.8 μm in average wide and 50-150 nm in width.

Considering the viscosity, the light absorbents of the present invention are prepared into 0.5-5% (w/w) solutions in the above organic solvents, and then uniformly coated over substrates to form a dried recording layer with 10-1,000 nm, preferably, 50-300 nm in thickness. Prior to the coating of the solutions, preliminary layers can be formed over the substrates to protect them and improve the adhesion ability of the substrates, if necessary. Materials for the preliminary layers are, for example, high molecular weight substances such as ionomer resins, polyamide resins, vinyl resins, natural resins, silicons, and liquid rubbers. In the case of using binders, the following polymers can be used alone or in combination in a weight ratio of 0.01-10 times of the light absorbent(s): Cellulose esters such as nitrocellulose, cellulose phosphate, cellulose sulfate, cellulose acetate, cellulose propionate, cellulose lactate, cellulose palmitate, and cellulose acetate/propionate; cellulose ethers such as methyl cellulose, ethyl cellulose, propyl cellulose, and butyl cellulose; vinyl resins such as polystyrene, poly(vinyl chloride), poly(vinyl acetate), poly(vinyl acetal), poly(vinyl butyral), poly(vinyl formal), poly(vinyl alcohol), and poly(vinyl pyrrolidone); copolymer resins such as styrene-butadiene copolymers, styrene-acrylonitrile copolymers, styrene-butadiene-acrylonitrile copolymers, vinyl chloride-vinyl acetate copolymers, and maleic anhydride copolymers; acrylic resins such as poly(methyl methacrylate), poly(methyl acrylate), polyacrylate, polymethacrylate, polyacrylamide, and polyacrylonitrile; polyesters such as poly(ethylene terephthalate); and polyolefins such as polyethylene, chlorinated polyethylene, and polypropylene.

Explaining the method for using the optical recording media according to the present invention, the high-density optical recording media such as DVD-Rs according to the present invention can write information at a relatively high density by using laser beams with wavelengths of 450 nm or less, particularly, 350-450 nm irradiated by semiconductor lasers such as those of InN, GaN, InGaN, InAlGaN, InGaNAs, BlnN, InGaNP, InP, GaP, GaAsP, and SiC, which oscillate in a blue or blue-violet region; or other laser beams, which oscillate in a red region, for example, distributed feed back lasers in which second harmonic generating mechanisms are installed in AlGaAs semiconductor laser elements. To read information, laser beams are used which have wavelengths similar to or slightly shorter or longer than those used for writing information. As for the laser power for writing and reading information, in the optical recording media of the present invention, it is preferably set to a relatively high level which exceeds the threshold of the energy required for forming pits when used for writing information, while it is preferably set to a relatively low level, i.e., a level below the threshold, when used for reading the recorded information, although the laser power level varies depending on the types and ratios of other light-resistant improvers used in combination with the light absorbents of the present invention: Generally, the laser power level can be controlled by increasing or decreasing to a power level of over 5 mW, usually, 10-50 mW for writing; and to a power level of 5 mW or lower, usually, 0.1-5 mW for reading the recorded information. The recorded information is read out by detecting the changes of both the reflection light level and the transmission light level in the pits and the pit-less parts on the recorded surface of optical recording media.

Accordingly, in the optical recording media according to the present invention, quite minute pits with a pit width of below 0.5 μm/pit and a track pitch of below 0.74 μm, which are below the levels of the existing DVD-Rs, can be formed smoothly at a relatively high density using a laser element with an oscillation wavelength of 450 nm or less. For example, in the case of using a substrate, 12 cm in diameter, one can prepare an extremely high density optical recording medium having a recording capacity far exceeding 4.7 GB per one side, i.e., a recording capacity for about two hours of information in the form of images and voices in quality similar to that of high quality televisions, which recording capacity could not be easily attained by the existing DVD-Rs.

Since the optical recording media according to the present invention can record information in the form of characters, images, voices, and other digital information at a relatively high density, they are advantageously useful as recording media for professional and family use to record/backup/keep documents, data, and computer software. Particular examples of the kinds of industries and the forms of information, to which the optical recording media of the present invention can be applied, are as follows: Drawings of construction and engineering works, maps, ledgers of loads and rivers, aperture cards, architectural sketches, documents of disaster protection, wiring diagrams, arrangement plans, information from newspapers and magazines, local information, reports of construction works, etc., which all relate to architecture and civil construction; blueprints, ingredient tables, prescriptions, product specifications, product price tables, parts lists, maintenance information, case study files of accidents and problems, manuals for claims, production schemes, technical documents, sketches, details, company house-made product files, technical reports, analysis reports, etc., which all relate to manufacturing; customer information, correspondents information, company information, contracts, information from newspapers and magazines, business reports, reports of company credibility, records of stocks, etc., which all relate to sales; company information, records of stocks, statistical documents, information from newspapers and magazines, contracts, customer lists, documents of application/notification/licenses/authorization, business reports, etc., which all relate to finance; information regarding properties, sketches of construction, maps, local information, information from newspapers and magazines, contracts of leases, company information, stock lists, traffic information, correspondents information, etc., which all relate to real property and transportations; diagrams of writings and piping arrangements, documents of disaster protection, tables of operation manuals, documents of investigations, technical reports, etc., which all relate to electric and gas supplies; patient files, files of patient clinical histories and case studies, diagrams of medical care/institution relationships, etc., which all relate to medical fields; texts, collections of questions, educational documents, statistical information, etc., which all relate to private and preparatory schools; scientific papers, records in academic societies, monthly reports of research, research data, documentary records and indexes thereof, etc., which all relate to universities, colleges, and research institutes; inspection data, literatures, patent publications, weather maps, analytical records of data, customer files, etc., which all relate to information; case studies on laws; membership lists, history notes, records of works/products, competition data, data of meetings/congresses, etc., which all relate to organizations/associations; sightseeing information, traffic information, etc., which all relate to sightseeing; indexes of homemade publications, information of newspapers and magazines, who's who files, sport records, telop files, scripts for broadcastings, etc., which all relate to mass communications and publishing; and maps, ledgers of roads and rivers, fingerprint files, resident cards, documents of application/notification/license/authorization, statistical documents, public documents, etc., which all relate to government offices. Particularly, the write-once type optical recording media of the present invention can be advantageously useful for storing records of patient files and official documents, which must not be deleted or rewritten intentionally, and also used as electronic libraries for art galleries, libraries, museums, broadcasting stations, etc.

As a rather specific use, the optical recording media of the present invention can be used to prepare and edit compact discs, digital video discs, laser discs, MDs (a mini disc as information recording system using photomagnetic disc), CDVs (a laser disc using compact disc), DATs (an information recording system using magnetic tape), CD-ROMs (a read-only memory using compact disc), DVD-ROMs (a read-only memory using digital video disc), DVD-RAMs (a writable and readable memory using digital video disc), digital photos, movies, video software, audio software, computer graphics, publishing products, broadcasting programs, commercial messages, computer software, game software, etc.; and used as external program recording means for large-sized computers and car navigation systems.

Hereinbefore, the use of the light absorbents of the present invention in the field of optical recording media has been mainly explained with reference to their application examples to organic optical recording media which use laser beams with wavelengths of 450 nm or less as a writing light. However, in the field of optical recording media, the light absorbents of the present invention can be advantageously used not only in high-density optical recording media but commonly used in optical recording media such as CD-Rs and DVD-Rs as materials for controlling and calibrating the absorptance and the reflectance by combining them with one or more other organic dye compounds which are sensitive to laser beams with wavelengths of 635-650 nm or 775-795 nm. Even in the case of using organic optical recording media which use laser beams with wavelengths of 450 nm or less as a writing light, pits can be indirectly formed, without directly forming pits on substrates using the monomethine cyanine dyes of the present invention, by combining with one or more other organic dye compounds sensitive to a longer wavelength light, for example, a laser beam with a wavelength of 635-650 nm or 775-795 nm, in such a manner that an exited energy by laser beams with wavelengths of 450 nm or less is transferred through the monomethine cyanine dyes to the organic dye compounds to decompose the compounds. The term "optical recording media" as referred to in the present invention means those in general which use the characteristic features of specific monomethine cyanine dyes that have absorption maxima in a relatively short-wavelength visible region and substantially absorb such a visible light, and includes, in addition to the organic optical recording media, for example, those prepared by the thermal coloration method which uses the chemical reaction of coloring agents and developers induced by the heat generated when the organic dye compounds absorb light, and those prepared by the technique called "moth-eye type technique" which uses the phenomenon that the above heat smoothes the pattern of periodical unevenness, provided on the surface of substrates.

The monomethine cyanine dyes of the present invention have absorption maxima in a region ranging from an ultraviolet region to a relatively short wavelength visible region and substantially absorb light in such a visible region, and therefore in addition to being used in the aforesaid optical recording media, they can be advantageously used as materials for polymerizing polymerizable compounds by exposure to visible light, light absorption materials for lithography, laser action substances in dye lasers which oscillate in a blue or blue-violet region, and light absorbents for dying clothes. If necessary, in combination with one or more other light absorbents capable of absorbing light in ultraviolet, visible and/or infrared regions, the light absorbents of the present invention can be used in clothes in general and other materials including building/bedding/decorating products such as drapes, laces, casements, prints, venetian blinds, roll screens, shutters, shop curtains, blankets, thick bedquilts including comforters, peripheral materials for thick bedquilts, covers for thick bedquilts, cottons for thick bedquilts, bed sheets, Japanese cushions, pillows, pillow covers, cushions, mats, carpets, sleeping bags, tents, interior finishes for cars, and window glasses including car window glasses; sanitary and health goods such as paper diapers, diaper covers, eyeglasses, monocles, and lorgnettes; internal base sheets/linings/materials for shoes; wrappers; materials for umbrellas; parasols; stuffed toys; lighting devices; filters/panels/screens for information displaying devices such as televisions and personal computers which use cathode-ray tubes, liquid crystal displays, electroluminescent displays, and plasma displays; sunglasses; sunroofs; sun visors; pet bottles; storage; vinyl houses; lawns; optical fibers; prepaid cards; and windows of ovens including electric ovens. When used for wrapping, injecting, and enclosing the above articles, the light absorbents of the present invention advantageously prevent living bodies and products from problems and discomforts induced by environmental lights such as natural and artificial light or minimize the above problems and discomforts. Furthermore, they can advantageously regulate the color, tint, and appearance and adjust the light reflected from or passed through the articles to a desired color balance.

The following examples describe the preferred embodiments according to the present invention:

EXAMPLE 1

Monomethine Cyanine Dyes

Five grams of 3-ethyl-2-methylthiazolium iodide, six grams of 3-methyl-2-methylthiobenzoxazolium methylsulfate, 2.5 ml of triethylamine, and 25 ml of acetonitrile were placed in a reaction vessel, and the mixture was heat refluxed for two hours, followed by removing the acetonitrile by distillation and washing the resulting residues with ethyl ether and acetone. The crude crystal formed was collected and recrystallized in ethanol to obtain 1.3 g of a yellow crystal of the monomethine cyanine dye, represented by Chemical Formula 4. Upon conventional measurement, the crystal had a melting point of 199-200° C.

The monomethine cyanine dye with satisfactory optical properties thus obtained can be used in various fields as light absorbents including optical recording media.

EXAMPLE 2

Monomethine Cyanine Dye

Three grams of 2,3,4-trimethyloxazolium iodide, 2.4 g of 3-ethyl-4-methyl-2-methylthiothiazolium iodide, 2 ml of triethylamine, and 20 ml of acetonitrile were placed in a reaction vessel, and the mixture was heat refluxed for two hours. Thereafter, the reaction mixture was treated similarly as in Example 1 to obtain 0.8 g of a yellow crystal of the monomethine cyanine dye represented by Chemical Formula 17. Upon conventional measurement, the crystal had a melting point of 308° C.

The monomethine cyanine dye with satisfactory optical properties thus obtained can be used in various fields as light absorbents including optical recording media.

EXAMPLE 3

Monomethine Cyanine Dye 2.8 g of 3-methyl-2-methylthiobenzoxazolium methylsulfate, 3 g of 1,2,3,3-tetramethylindolenium iodide, 24 ml of pyridine, and 1.2 ml of acetic acid were placed in a reaction vessel, and the mixture was heat refluxed for three hours. The solvents were removed from the reaction mixture, and the residue was admixed with 20 ml of methanol and subjected to counter-ion exchange by the addition of 4.8 ml aqueous solution containing 1.6 g potassium iodide. Thereafter, the crude crystal formed was collected and recrystallized from methanol to obtain 1.2 g of a yellow crystal of the monomethine cyanine dye represented by Chemical Formula 36. Upon conventional measurement, the crystal had a melting point of 267-269° C.

The monomethine cyanine dye with satisfactory optical properties thus obtained can be used in various fields as light absorbents including optical recording media.

EXAMPLE 4

Monomethine Cyanine Dye 3.7 g of 3-methyl-2-methyl-5-phenylbenzoxazolium iodide, 2.9 g of 3-ethyl-2-methylthiobenzoxazolium iodide, 2.2 ml of triethylamine, and 20 ml of acetonitrile were placed in a reaction vessel, and the mixture was heat refluxed for two hours. The reaction mixture was treated similarly as in Example 1 to obtain 2.5 g of a yellow crystal of the monomethine cyanine dye represented by Chemical Formula 6. Upon conventional measurement, the crystal had a melting point of 280° C.

Although the production conditions and the yields of the monomethine cyanine dyes used in the present invention are somewhat varied depending on their structures, they, including the compounds represented by Formulae 1 to 48, can be produced in a desired yield by the methods in Examples 1 to 4 which comprise a step of reacting a quaternary ammonium salt of nitrogen atom-containing heterocyclic compound having a reactive methyl group with a quaternary ammonium salt of nitrogen atom-containing heterocyclic compound having an appropriate leaving group, or can be produced in accordance with conventional methods.

EXAMPLE 5

Optical Properties of Monomethine Cyanine Dye

Example 5-1

Light Absorption Properties of Monomethine Cyanine Dye

The monomethine cyanine dyes in Table 1 were measured for their visible absorption spectra when dissolved in methanol and formed on glass substrates, respectively. The results are tabulated in Table 1, and the visible absorption spectrum of the monomethine cyanine dye represented by Chemical Formula 17 when in a liquid form and in a thin-layer form are shown in FIG. 1.

TABLE 1

| Monomethine cyanine dye | Wavelength of absorption maximum (nm) | |
|---|---|---|
| | Solution | Thin layer |
| Chemical Formula 4 | 350 | 351 |
| Chemical Formula 6 | 380 | 371 |
| Chemical Formula 14 | 387 | 380 |
| Chemical Formula 16 | 383 | 374 |
| Chemical Formula 17 | 379 | 375 |
| Chemical Formula 36 | 396 | 440 |
| Chemical Formula 38 | 341 | 342 |

As evident from the results in Table 1 and FIG. 1, the monomethine cyanine dyes tested had absorption maxima in relatively short wavelength visible regions, particularly, at wavelengths of 450 nm or less both in the forms of solution and thin layer. Most of these monomethine cyanine dyes had absorption maxima at wavelengths of 350-400 nm when in solution and thin layer forms, and the ends of their absorption maxima in their longer wavelength regions extended up to about 450 nm when in a thin layer form. The fact evidences that the light absorbents, comprising the monomethine cyanine dyes of the present invention, have sensitivity to a relatively short-wavelength visible light, and most of the light absorbents substantially absorb laser beams with wavelengths of 450 nm or less in their longer wavelength regions with their absorption maxima.

Example 5-2

Light-Resistance Improvement for Monomethine Cyanine Dye

Fifteen milligrams of either of the monomethine cyanine dyes in Table 2 was added to three milliliters of TFP, and as a light-resistant improver two milligrams of the formazan nickel complex represented by Chemical Formula 49 disclosed in Japanese Patent Application No. 163,036/99, titled "Formazan metal complexes" applied for by the same applicant as the present invention, and the contents were dissolved in the solvent with a 5-minute ultrasonic energization at ambient temperature. Thereafter, in a usual manner, a prescribed volume of the resulting solution was dropped on either surface of a polished glass substrate, 5 cm×5 cm, while the glass substrate was rotated at a rotation rate of 1,000 rpm for one minute to uniformly coat the solution thereupon, and sequentially blown with hot air and cold air to dry the coated solution.

Chemical Formula 49:

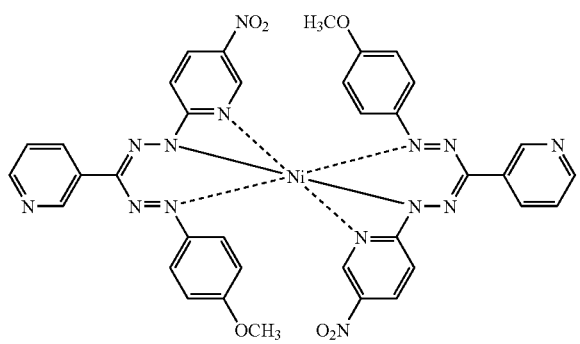

The resulting glass substrates coated with the monomethine cyanine dyes were measured for transmittance ($T_0$) at the wavelengths of their absorption maxima, and then fixed to a position 7 cm apart from a 500 W xenon lamp and exposed with the light for 25 min while cold air was blowing to the substrates. Immediately after that, the resulting substrates were remeasured for transmittance (T) at the wavelengths of the absorption maxima of the monomethine cyanine dyes, and the transmittances of T and $T_0$ for each monomethine cyanine dye were substituted for the Equation 1 to calculate the residual percentage (%) of each monomethine cyanine dye. In parallel, control systems with no light-resistant improver for each monomethine cyanine dye were provided and treated similarly as above. The results are shown in Table 2.

Equation 1:

$$\text{Residual percentage (\%) of monomethine cyanine dye} = \frac{100 - T}{100 - T_0} \times 100$$

TABLE 2

| Monomethine cyanine dyes | Residual percentage (%) of monomethine cyanine dye | |
|---|---|---|
| | With light-resistant improver | With no light-resistant improver |
| Chemical Formula 4 | 100.0 | 88.6 |
| Chemical Formula 5 | 100.0 | 96.6 |
| Chemical Formula 6 | 100.0 | 98.7 |
| Chemical Formula 17 | 100.0 | 80.6 |
| Chemical Formula 36 | 93.2 | 26.0 |

As shown in the results in Table 2, in the systems with no light-resistant improver, up to 74% of the monomethine cyanine dye had changed with only a 25-min exposure of light to become incapable of exerting its inherent optical properties. However, in the systems with the formazan metal complex represented by Chemical Formula 49, all of the monomethine cyanine dyes still remained intact up to a level of over 93% without changing even after the exposure of light. These results indicate that light-resistant improvers such as formazan metal complexes quite effectively inhibit the undesirable changing of the monomethine cyanine dyes inducible by the exposure of light such as natural- and artificial-lights.

EXAMPLE 6

Optical Recording Medium

To TFP was added, as a light absorbent, the monomethine cyanine dye, represented by Formula 6, 14, 16 or 17, to give a concentration of 3.0 w/w %, and the mixture was mixed with, as a light-resistant improver, the formazan metal complex represented by Chemical Formula 49 to give a concentration of 0.35% (w/w), and then heated and energized with ultrasound to dissolve the contents. The solution was in a usual manner filtered, and the filtrate was coated in a rotary manner over one side of an acrylic disc substrate, 12 cm in diameter, which concaves for expressing synchronizing signals and addresses of tracks and sectors had been transferred to the track's internal circuit, and dried to form a recording layer, 200 nm in thickness. Thereafter, the substrate was spattered with silver to form a reflection layer, 100 nm in thickness, to be closely attached on the surface of the recording layer, and the reflection layer was homogeneously coated in a rotatory manner with "DAICURE CLEAR SD1700", as a known ultraviolet ray hardening resin commercialized by Dainippon Ink and Chemicals, Inc., Tokyo, Japan, and irradiated to form a protective layer to be closely attached on the surface of the reflection layer. Thus, four types of optical recording media were obtained.

Every optical recording medium in this example can write a large amount of information in the form of documents, images, and voices at a relatively high density by using laser elements that oscillate at wavelengths of 450 nm or less.

As described above, the present invention was made based on the creation of novel monomethine cyanine dyes and the discovery of their industrially useful properties. Since the light absorbents of the present invention have absorption maxima in the visible region of a relatively short wavelength and substantially absorb the light in such a visible region, they have a variety of uses in the fields, for example, of optical recording media, optical polymerization, dye lasers, solar batteries, lithography, and dyeing. Particularly, the monomethine cyanine dyes, which substantially absorb visible light with wavelengths of 450 nm or less when in a thin layer form, can be advantageously useful as a light absorbent in high-density optical recording media such as DVD-Rs.

The optical recording media of the present invention, which contain the aforesaid light absorbents and use as a writing light laser beams with wavelengths of 450 nm or less, can form more minute pits on a restricted recording surface of the optical recording media at a shorter track pitch and at a relatively high density, as compared with the DVD-Rs now available which use polymethine dyes as light absorbents and write information using laser beams with wavelengths of 635 nm or 650 nm. Thus, with the optical recording media of the present invention, information in the form of characters, images, and voices, and other digital information can be recorded in a single disc of optical recording medium at a relatively high density and in a large amount. As a result, the cost per a bit required for recording information can be lowered by a large margin, and moving images and static images can be recorded for a relatively long period of time.

The monomethine cyanine dyes of the present invention with such usefulness can be easily obtained in a desired yield through a step of reacting a quaternary ammonium salt of nitrogen-atom-containing heterocyclic compound having a reactive methyl group with a quaternary ammonium salt of nitrogen atom-containing heterocyclic compound having an appropriate leaving group.

What is claimed is:

1. A light absorbent composition applied to an optical recording medium substrate having a track pitch of below 0.74 microns comprising (a) a monomethine cyanine dye of Formula 1 which has an absorption maximum at a wavelength of 450 nm or less when in a thin layer form; and (b) organic dye compounds other than said monomethine cyanine dye, said organic dye compounds being sensitive to a laser beam with a wavelength of 775 to 795 nm:

$$\varnothing 1-CH=\varnothing 2 \qquad \text{Formula 1:}$$

wherein in Formula 1, ø1 is a heterocyclic group represented by Formula 5 and ø2 is a heterocyclic group represented by any one of Formulae 2, 3, 4, 6, 7 and 8 as resonance structures;

Formula 2:

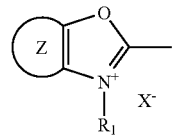

Formula 3:

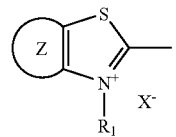

Formula 4:

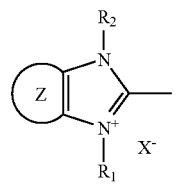

Formula 5:

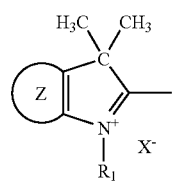

Formula 6:

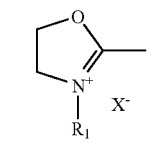

Formula 7:

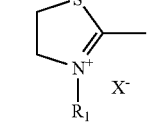

Formula 8:

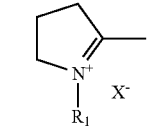

wherein throughout Formulae 2 to 5, Z represents an optionally substituting mono- or polycyclic aromatic ring or heterocycle which condenses to a nitrogen atom-containing five-membered heterocycle;

throughout Formulae 2 to 8, $R_1$ represents an aliphatic hydrocarbon group and $R_2$ represent hydrogen atom or the same or different aliphatic hydrocarbon group as in $R_1$, wherein the aliphatic hydrocarbon groups may have a substituent, and in Formulae 2 to 8, $X^-$ represents an azo metal complex anion being a member selected from the group consisting of:

(i)

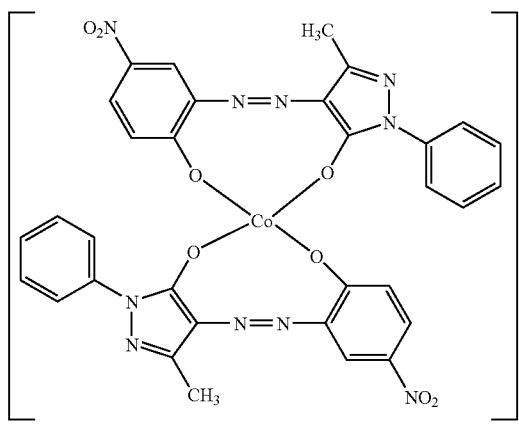

(ii)

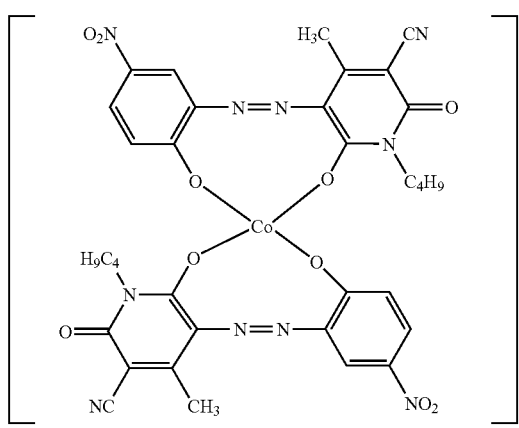

(ii)

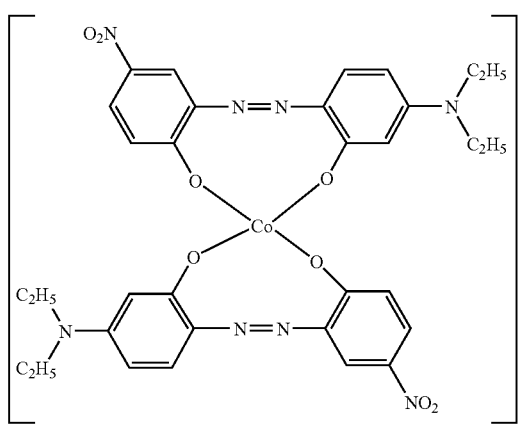

;

and (i) optionally at least one formazan metal complex.

2. An optical recording medium which records information at a pit width of below 0.5 μm/pit and a track pitch of below 0.74 μm by using a laser beam with a wavelength of 450 nm or less as a writing light and has a recording capacity of over 4.7 giga bytes (GB) per side when formed into a disk, 12 cm in diameter, said optical recording medium comprising (a) a monomethine cyanine dye of Formula 1, Formula 1 which has an absorption maximum at a wavelength of 450 nm or less when in a thin layer form; and (b) one or more members selected from the group consisting of organic dye compounds other than said monomethine cyanine dye, said organic dye compounds being sensitive to a laser beam with a wavelength of 775 to 795 nm:

$$\varnothing 1 - CH = \varnothing 2 \qquad \text{Formula 1:}$$

wherein in Formula 1, ø1 is a heterocyclic group represented by Formula 5 and ø2 is a heterocyclic groups represented by any one of Formulae 2, 3, 4, 6, 7 and 8 as resonance structures;

Formula 2:

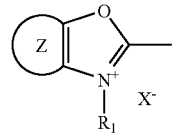

Formula 3:

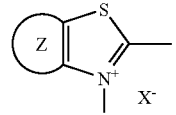

Formula 4:

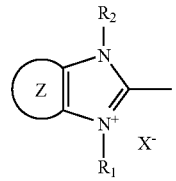

Formula 5:

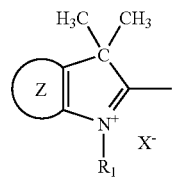

Formula 6:

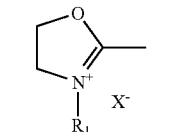

Formula 7:

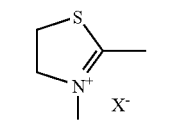

Formula 8:

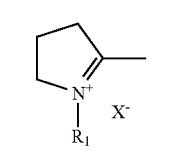

wherein throughout Formulae 2 to 5, Z represents an optionally substituting mono- or polycyclic aromatic ring or heterocycle which condenses to a nitrogen atom-containing five-membered heterocycle;

throughout Formulae 2 to 8, $R_1$ represents an aliphatic hydrocarbon group and $R_2$ represents a hydrogen atom or the same or different aliphatic hydrocarbon group as in $R_1$, wherein the aliphatic hydrocarbon groups may have a substituent, and in Formulae 2 to 8, $X^-$ represents an azo metal complex anion being a member selected from the group consisting of:

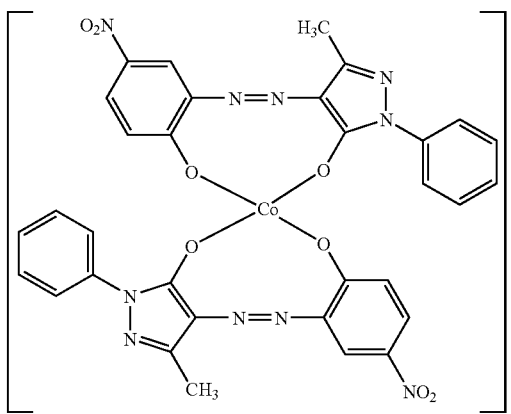

(i)

-continued

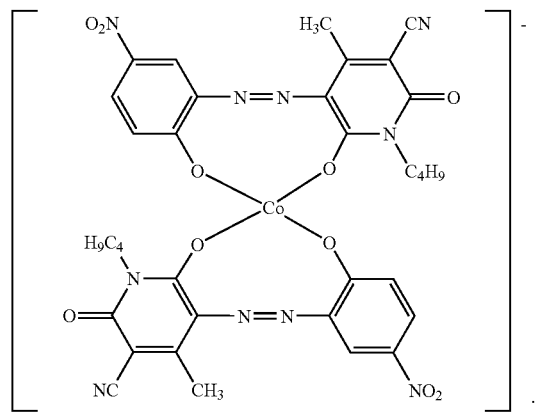

(ii)

* * * * *